United States Patent [19]
Takagi

[11] Patent Number: 5,852,336
[45] Date of Patent: *Dec. 22, 1998

[54] VIBRATION ACTUATOR WHICH EFFECTIVELY TRANSMITS MICRO-AMPLITUDE VIBRATIONS

[75] Inventor: Tadao Takagi, Yokohama, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 647,270

[22] Filed: May 13, 1996

Related U.S. Application Data

[63] Continuation of Ser. No. 377,782, Jan. 24, 1995, abandoned.

[30] Foreign Application Priority Data

Jan. 31, 1994 [JP] Japan .................................. 6-009823

[51] Int. Cl.⁶ .............................. H02N 2/00; H01L 41/08
[52] U.S. Cl. .................................................. 310/323
[58] Field of Search ............................................... 310/323

[56] References Cited

U.S. PATENT DOCUMENTS

| | | | |
|---|---|---|---|
| 4,019,073 | 4/1977 | Vishnevsky et al. | 310/323 |
| 4,975,614 | 12/1990 | Honda | 310/323 |
| 5,039,899 | 8/1991 | Yamaguchi | 310/323 |
| 5,101,132 | 3/1992 | Yamaguchi | 310/323 |
| 5,130,599 | 7/1992 | Toda | 310/323 |
| 5,140,215 | 8/1992 | Yamaguchi | 310/323 |
| 5,191,688 | 3/1993 | Takizawa et al. | 310/323 |
| 5,319,278 | 6/1994 | Myohga et al. | 310/323 |
| 5,436,522 | 7/1995 | Tsukimoto et al. | 310/323 |

FOREIGN PATENT DOCUMENTS

| | | | |
|---|---|---|---|
| 0262069 | 10/1988 | Japan | 310/323 |
| 0222672 | 9/1989 | Japan | 310/323 |
| 0577591 | 10/1977 | U.S.S.R. | 310/328 |
| 0625273 | 8/1978 | U.S.S.R. | 310/328 |
| 0636760 | 12/1978 | U.S.S.R. | 310/328 |

OTHER PUBLICATIONS

Ultrasonic Motors Theory and Applications, S. Ueha and Y. Tomikawa, Oxford Science Publications 1993, all pages.

Piezoelectric Linear Motors for Application to Driving a Light Pick–Up Element, Y. Tomikawa, M. Aoyagi, T. Ogasawara, A. Yabuki, Tohoku Institute of Technology, Jun. 9–11, 1993, all pages.

*Primary Examiner*—Thomas M. Dougherty

[57] ABSTRACT

An ultrasonic vibration motor having an elastic body and piezo-electric elements which are joined to the elastic body to harmonically produce a longitudinal oscillation mode and a bending oscillation mode on the elastic body, and to produce elliptical movement of a specified part of elastic body. A rotational member contacts a specified part of the elastic body and is driven to rotate by the elliptical movement of the specified part of the elastic body. A relative movement member is driven by the rotational member. The relative movement member may be driven, even if it has a soft surface, by effectively transmitting oscillations of a micro-amplitude produced on the specified part of the elastic body.

15 Claims, 7 Drawing Sheets

VIBRATION ACTUATOR WHICH EFFECTIVELY TRANSMITS MICRO-AMPLITUDE VIBRATIONS

This application is a continuation of application Ser. No. 08/377,782, filed Jan. 24, 1995, now abandoned.

BACKGROUND OF THE INVENTION

1. Field of the Invention

The present invention relates to an ultrasonic vibration motor or vibration actuator which generates drive force by producing elliptical movement of a rod-shaped elastic body, and, more particularly, the present invention relates to an ultrasonic vibration motor or vibration actuator which has a two-phase drive of the rod-shaped elastic body in a longitudinal oscillation mode and a bending oscillation mode.

2. Description of the Related Art

Figure 8:
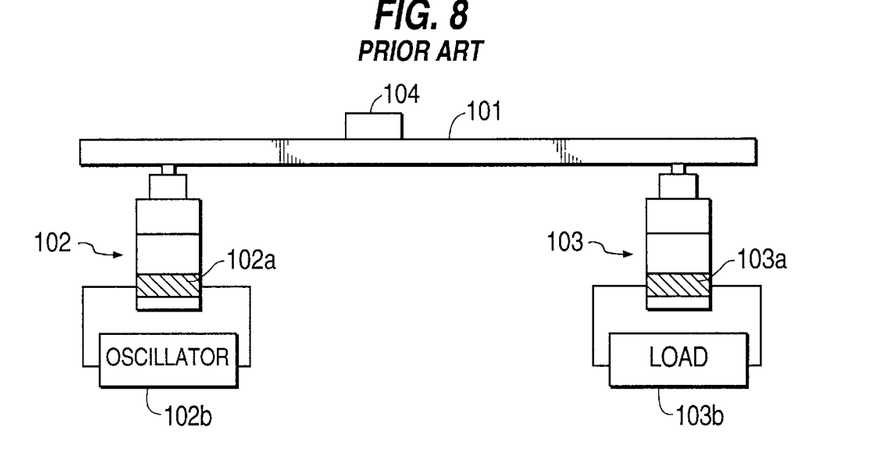
FIG. 8 is a schematic view showing an example of a conventional linear type ultrasonic vibration motor.

Linear ultrasonic vibration motors are known as shown, for example, in FIG. 8. The conventional linear ultrasonic vibration motor shown in FIG. 8 includes an excitation transformer 102 arranged on one side of a rod-shaped elastic body 101, a damping transformer 103 positioned on an opposite side of the rod-shaped elastic body 101, and an excitation vibrator 102a and a damping vibrator 103a joined to transformers 102 and 103, respectively. By applying alternating current from an oscillator 102b to the excitation vibrator 102a, the rod-shaped elastic body 101 is made to oscillate, and this oscillation is a progressive vibration propagated through the rod-shaped elastic body 101. A moving body 104, which is pressure joined to the rod-shaped elastic body 101, is driven by the progressive vibration of the rod-shaped elastic body 101. The oscillation of the rod-shaped elastic body 101 is transmitted to the vibrator 103a through damping transformer 103, and the oscillation energy is converted to electrical energy by the vibrator 103a. A load 103b, connected to the vibrator 103a, absorbs the oscillation energy by consuming the electrical energy generated by vibrator 103a. The damping transformer 103 prevents the production of standing vibrations of a mode inherent to the rod-shaped elastic body 101 by suppressing the reflection of the end surface of the rod-shaped elastic body 101.

Various problems have occurred with the conventional type of linear ultrasonic vibration motor shown in FIG. 8. For example, the conventional type of linear ultrasonic vibration motor only has the moveable range of the moving body 104; the rod-shaped elastic body 101 must be long; the entire rod-shaped elastic body 101 must be made to vibrate; and, the ultrasonic vibration motor must be made large scale. Further, to prevent the generation of standing vibrations of a particular mode, damping transformer 103 is necessary.

Figure 9A:
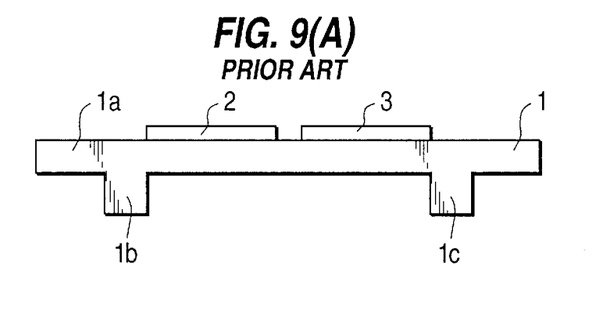
FIGS. 9(A)–9(C) are front, side and top views, respectively, showing an example of a conventional asymmetric longitudinal L1-flex B4-mode flat-plate motor.
Figure 9B:
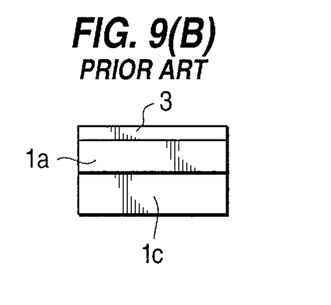
Figure 9C:
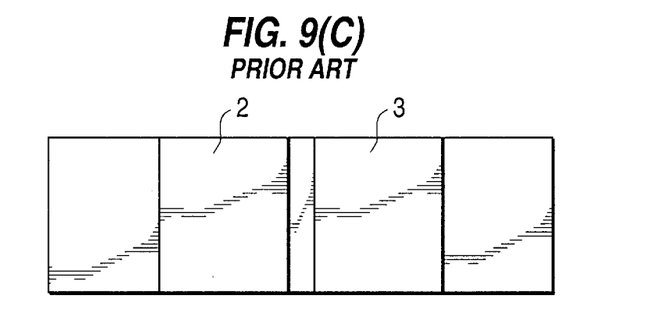

To eliminate the kinds of problems noted above, a variety of self-advancing type ultrasonic vibration motors have been proposed, for example, the "asymmetric degeneracy longitudinal L1-flex B4-mode flat-plate motor" which is listed in "222 Piezo Linear Motors for the Purpose of Optical Pickup Movement" of the "Proceedings of the Fifth Electromagnetic Force Dynamics Symposium". FIGS. 9(A)–9(C) show an example of a conventional asymmetric degeneracy longitudinal L1-flex B4-mode flat-plate motor, where FIG. 9(A) is a front view, FIG. 9(B) is a side view and FIG. 9(C) is a top view.

As shown in FIGS. 9(A)–9(C), the asymmetric degeneracy longitudinal L1-Flex B4-mode flat-plate motor includes an elastic body 1 having a rectangular flat plate shaped base 1a, and protruding parts 1b and 1c formed on one surface of the base 1a. Piezo-electric elements 2 and 3 are fixed to the side of the base 1a opposite to protruding parts 1b and 1c, respectively, and piezo-electric elements 2 and 3 generate longitudinal oscillation L1 mode and flex oscillation B4 mode. The protruding parts 1b and 1c of the elastic body 1 are provided on the antinode position of the flex oscillation B4 movement which is generated on the base 1a, and drive a relative movement member, which may be guided by, e.g., guide rails (not shown).

The oscillation amplitude of the elliptical movement which the elastic body 1 produces is generally about several $\mu$. However, if, for example, the object to be driven (i.e., the relative movement member) comprises optical fibers which have a soft surface, even when the elastic body 1 produces an oscillation amplitude of up to $10\mu$, a problem occurs in that the relative movement member cannot be driven by the elastic body 1.

SUMMARY OF THE INVENTION

Accordingly, it is an object of the present invention to provide an ultrasonic vibration motor which eliminates the problems of the conventional ultrasonic vibration motors described above.

It is a further object of the present invention to provide an ultrasonic vibration motor which is capable of easy drive action, even if the relative movement member has a soft surface, by effectively transmitting vibrations of a micro amplitude that are produced by a specified part of the elastic body.

Additional objects and advantages of the invention will be set forth in part in the description which follows, and, in part, will be obvious from the description, or may be learned by practice of the invention.

Objects of the present invention are achieved by an ultrasonic vibration motor which includes an elastic body having electro-mechanical conversion elements joined to the elastic body to harmonically produce a longitudinal oscillation mode and a bending oscillation mode on the elastic body, and to produce elliptical movement of a specified part of the elastic body. A first rotational member contacts the specified part of the elastic body which undergoes elliptical movement, and is driven to rotate by the elliptical movement of the specified part of the elastic body.

The ultrasonic vibration motor may also include a relative movement member which is driven by the rotation of the first rotational member. The relative movement member may have a surface hardness to a degree that it cannot be directly contact driven by the elliptical movement of the specified part of the elastic body, but can be driven by the first rotational member.

The ultrasonic vibration motor may also include a first support member to support the first rotational member, a second support member to support the elastic body and a pressure application member to apply pressure in a direction to make the elastic body and the first rotational member come in contact.

The ultrasonic vibration motor in accordance with an embodiment of the present invention may further comprise a second rotational member which is arranged such that the first and second rotational members are on either side of the relative movement member; a first support member to support the first and second rotational members; a second support member to support the elastic body; and a pressure application member to apply pressure in a direction to make the elastic body and the first rotational member come in contact. The first and/or second rotational member(s) may comprise a guide to control the position of the relative movement member. The guide for the first and/or second rotational member(s) may have a grooved portion corresponding to the exterior shape of the relative movement member.

The first and/or second rotational member(s) may also include a displacement absorption device which allows displacement of the rotational members in a direction to absorb the compression deflections of the relative movement member. The displacement absorption device comprises a guide part formed on the first support member which mobilely guides the first and/or second rotational member(s) in the deflection direction of the relative movement member, and an energization member which energizes the first and/or second rotational member(s) in the direction opposite to the deflection direction.

According to the preferred embodiments of the present invention, micro-elliptical movement produced by the elastic body is transmitted through rotational members to the relative movement member, and oscillations of a micro-amplitude can be effectively transmitted to the relative movement member, making it possible to drive a relative movement member which has a soft surface. Further, because micro-elliptical movement produced in the elastic body is transferred through the rotational members to the relative movement member, oscillations of a micro-amplitude are effectively transferred to the relative movement member, and it is possible to drive a relative movement member having a soft surface.

BRIEF DESCRIPTION OF THE DRAWINGS

Reference will now be made in detail to the present preferred embodiments of the present invention, examples of which are illustrated in the accompanying drawings, wherein like reference numerals refer to like elements throughout.

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1A:
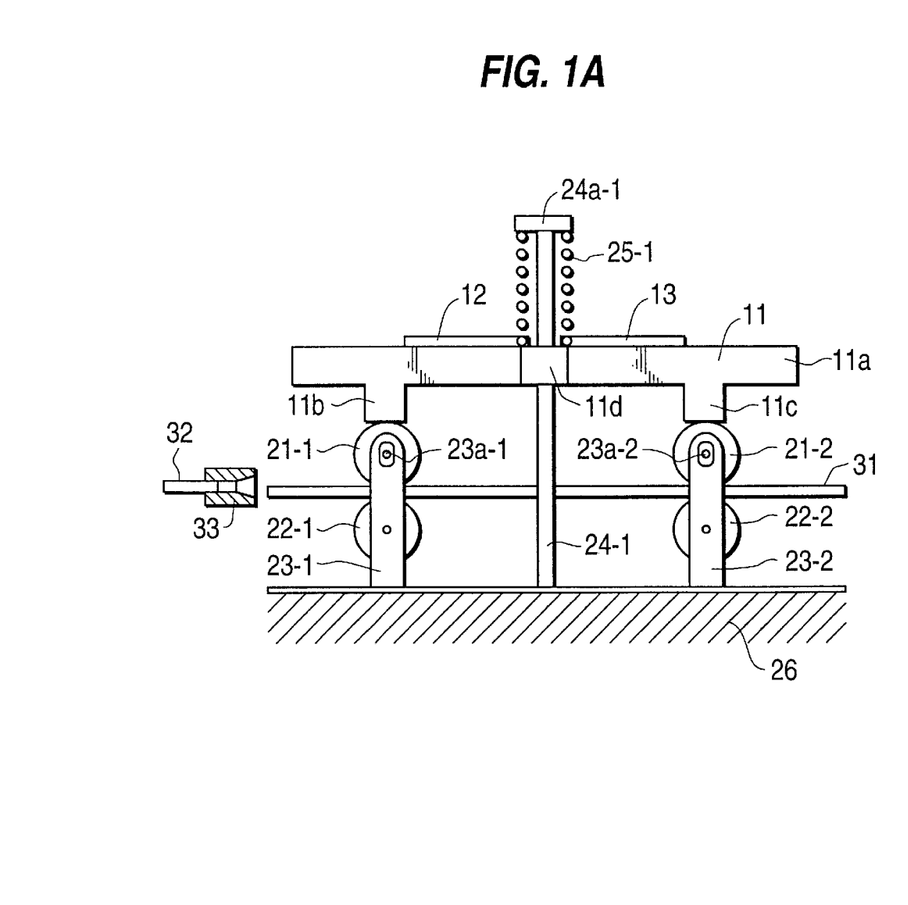
FIGS. 1A and 1B are a front view and a side view, respectively, of an ultrasonic vibration motor in accordance with a first embodiment of the present invention.
Figure 1B:
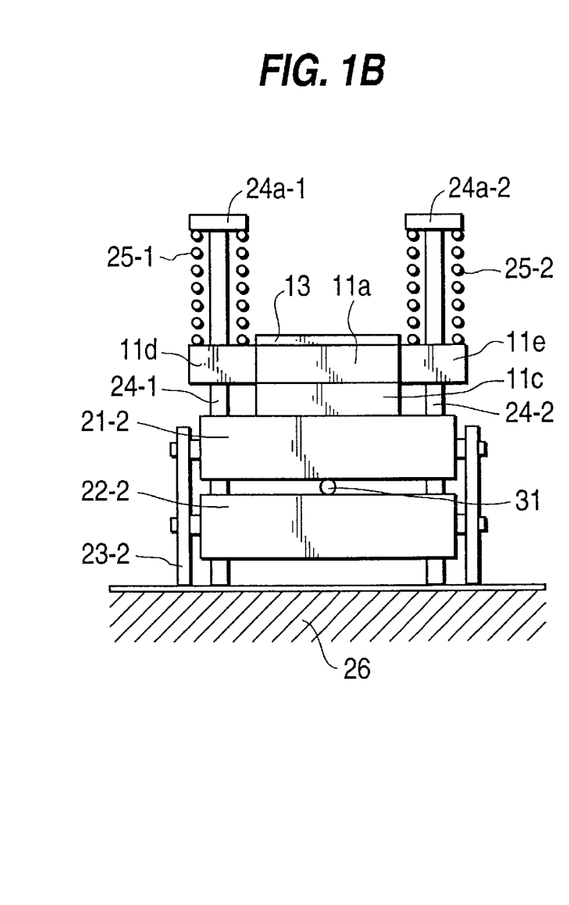
Figure 2D:
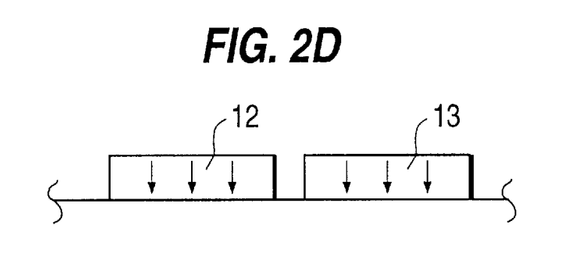
Figure 3A:
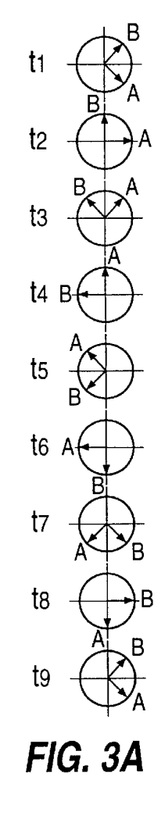
FIG. 3A–3D are diagrams used to explain the drive motion of an ultrasonic vibration motor in accordance with embodiments of the present invention.

FIGS. 1A and 1B are a front view and a side view, respectively, of an ultrasonic vibration motor in accordance with a first embodiment of the present invention. The ultrasonic vibration motor is also referred to as a vibration actuator. The ultrasonic vibration motor in accordance with the first embodiment of the invention includes an elastic body 11 having a base 11a with two protuberances 11b and 11c. Piezo-electric elements 12 and 13 for generating longitudinal oscillation L1 mode and flex oscillation B4 mode are arranged on the base 11a. The functions of the elastic body 11, base 11a, protuberances 11b and 11c and piezo-electric elements 12 and 13 are the same as those of the corresponding elements described above with respect to FIGS. 9(A)–(C). In accordance with the first embodiment of the present invention, piezo-electric elements 12 and 13 are polarized as shown in FIG. 2D, and two-phase input voltages A and B are applied to piezo-electric elements 12 and 13, respectively, as shown in FIG. 3A, described in more detail below.

Rotational members 21 (21-1, 21-2) and 22 (22-1, 22-2), which are cylindrical or circularly shaped, are supported to rotate freely by support members 23-1, 23-2, respectively. A relative movement member 31, which is the object to be driven, is placed between rotational members 21-1, 22-1 and 21-2, 22-2. Support members 23-1 and 23-2 are secured to a securing member 26. The support members 23-1 and 23-2 include long holes 23a-1 and 23a-2 which support rotational members 21-1 and 21-2, respectively, such that up and down displacement in a deflection direction of the relative movement member 31 is possible. The rotational members 21-1 and 21-2 make contact with the two protuberances 11b and 11c, respectively, of elastic body 11.

The relative movement member 31 comprises a substance having a soft surface, for example, a soft resin, a soft metal, or an organic substance such as soft wood or paper. Alternatively, the relative movement member 31 may have a layer of a soft substance on its surface, and may be shaped in various ways, such as fiber shaped, thread shaped, sheet shaped, card or block shaped. Further, the relative movement member 31 may be a rod, such as a plunger, or it may be made so as to drive an object at its end. As a specific example, the ultrasonic vibration motor in accordance with the first embodiment of the invention may use optical fibers which have been coated with a soft resin as the relative movement member 31. In accordance with the first embodiment, the optical fiber 31 is connected by a connector 33 to the end of another optical fiber 32.

To efficiently utilize the elliptical movement produced in elastic body 11 to move the relative movement member 31, at least the surfaces of rotational members 21-1, 21-2 may comprise a resin. Also, if the surfaces of rotational members 21-1, 21-2 comprise a metal, a resin layer may be formed on a part by which the elastic body 11 contacts a rotational member 21-1, 21-2.

A pressure application member 25 (25-1, 25-2) is arranged between a flange 24a (24a-1, 24a-2) of support members 24 (24-1, 24-2), which support the elastic body 11 and are secured to the securing member 26, and struts 11d and 11e that are provided on the elastic body 11, such that the elastic body 11 applies pressure to the relative movement member 31. The pressure application member 25 also serves to energize the rotational members 21, 22 in a direction opposite to the displacement of the rotational members 21, 22 caused by compression deflections of the relative movement member 31.

Figure 2A:
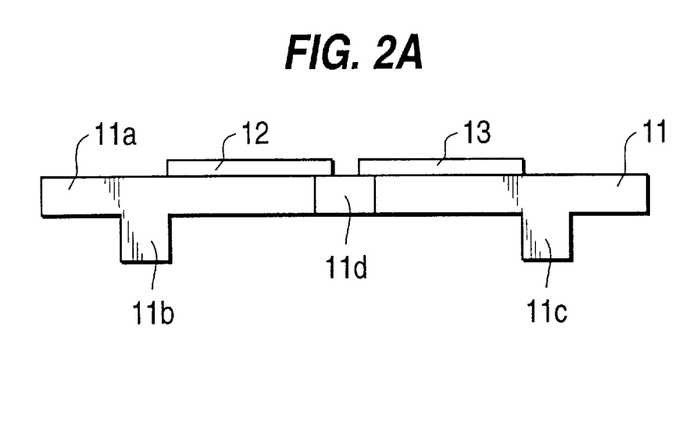
FIGS. 2A–2D are front, side, and top views, respectively, of an elastic body of the ultrasonic vibration motor in accordance with the first embodiment of the present invention.
Figure 2B:
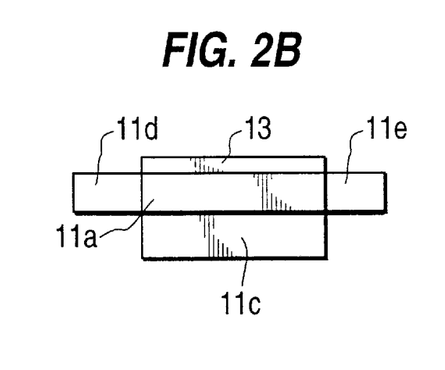
Figure 2C:
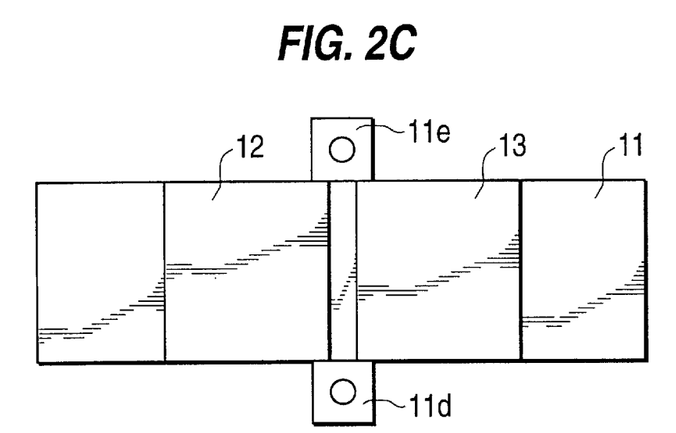

FIGS. 2A–2C show several views of the elastic body 11 in accordance with the first embodiment of the present invention. FIG. 2A is a front view, FIG. 2B is a side view and FIG. 2C is a top view. As shown in FIGS. 2A–2C, the ultrasonic vibration motor has a configuration such that composite oscillations, comprising bending oscillations and longitudinal oscillations, occur by the application of high frequency voltages A and B to the two piezo-electric elements 12 and 13. These composite oscillations produce elliptical movement on the ends of protuberances 11b and 11c, and the elliptical movement drives rotational members 21. As shown in FIG. 2A, G is the ground. Moreover, as shown in FIG. 2D, the two piezo-electric elements 12 and 13 are polarized so that they have mutual polarity in the same direction, and the high frequency voltages A and B have a temporal phase difference of $\pi/2$. Alternatively, the two piezo-electric elements 12 and 13 may also be polarized in mutually opposite directions.

Figure 3B:
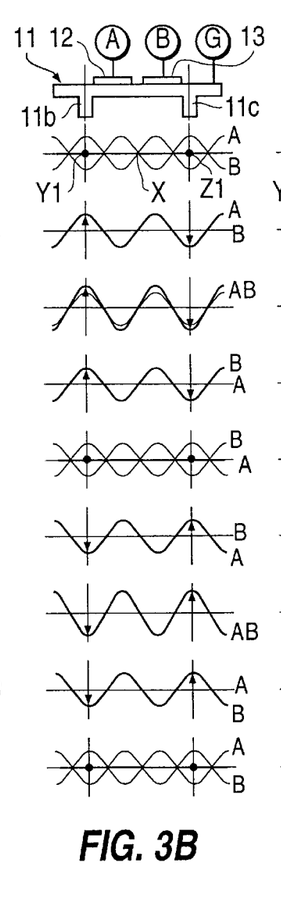
Figure 3C:
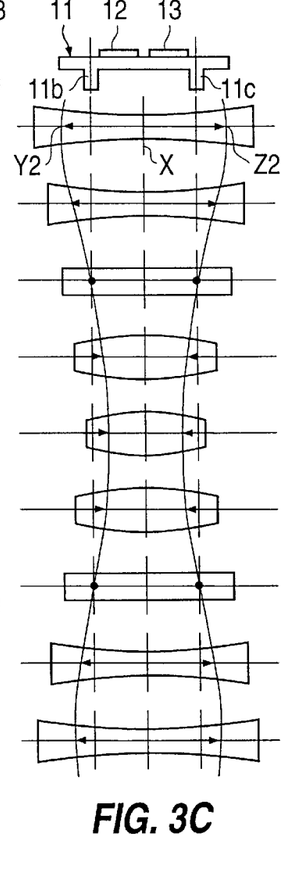
Figure 3D:
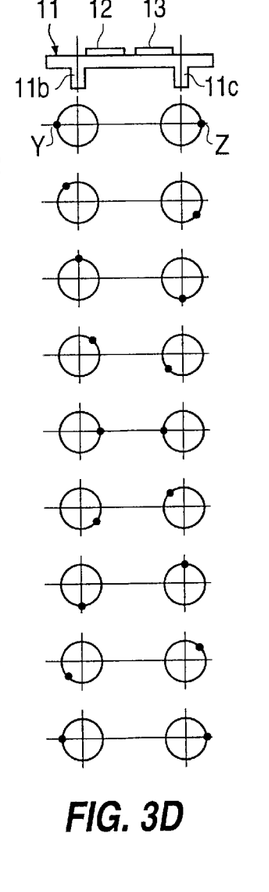

FIG. 3A shows the temporal changes of the two-phase high frequency voltages A and B input to the ultrasonic vibration motor at times t1–t9. The horizontal axis of FIG. 3A indicates the effective value of the high frequency voltage. FIG. 3B shows the conditions of deformation of a cross section of the ultrasonic vibration motor, and indicates the temporal changes (at t1–t9) of the bending oscillations which are generated by the ultrasonic vibration motor. FIG. 3C shows the conditions of deformation of a cross section of the ultrasonic vibration motor, and indicates the temporal changes (at t1–t9) of the longitudinal oscillations generated by the ultrasonic vibration motor. FIG. 3D shows the temporal changes (at t1–t9) of the elliptical movement that the ultrasonic vibration motor generates on protuberances 11b and 11c.

The operation of the ultrasonic vibration motor in accordance with the first embodiment of the invention will be described below for each temporal change of the two-phase high frequency voltages A and B at times t1 through t9.

As shown in FIG. 3A, at time t1, high frequency voltage A is a positive voltage, and high frequency voltage B is an equal positive voltage with a phase difference of $\pi/2$. As shown in FIG. 3B, the bending oscillation caused by high frequency voltages A and B cancels each other out, and material points Y1 and Z1 have zero amplitude. Further, as shown in FIG. 3C, the longitudinal oscillations generated by high frequency voltages A and B are in the elongating direction. As indicated by the arrows, material points Y2 and Z2 show the maximum elongation, where segment X is taken to be the center. As shown in FIG. 3D, when both the bending oscillation and longitudinal oscillation are combined, the combination of the movement of material points Y1 and Y2 makes up the movement of material point Y, and the combination of the movement of material points Z1 and Z2 makes up the movement of material point Z.

At time t2, as shown in FIG. 3A, high frequency voltage B is zero, and high frequency voltage A is a positive voltage. As shown in FIG. 3B, the bending oscillation generated by high frequency voltage A causes material point Y1 to oscillate in the positive direction, whereas the bending oscillation generated by high frequency voltage B causes material point Z1 to oscillate in the negative direction. Moreover, as shown in FIG. 3C, the longitudinal oscillation generated by high frequency voltages A and B, causes material points Y2 and Z2, respectively, to contract more than at time t1. As a result, as shown in FIG. 3D, when both the bending and longitudinal oscillations combine the material points Y and Z move by circulating in a clockwise direction from their-respective positions at time t1.

At time t3, as shown in FIG. 3A, high frequency voltage A applied to piezo-electric element 12 is a positive voltage, and high frequency voltage B applied to piezo-electric element 13 is an equal negative voltage. As shown in FIG. 3B, the bending oscillation caused by the high frequency voltages A and B combine to amplify the resulting bending oscillation of material points Y1 and Z1. More particularly, material point Y1 is amplified in the positive direction more than at time t2, to a maximum positive amplitude value, and material point Z1 is amplified in the negative direction more than at time t2, to a maximum negative amplitude value. Moreover, as shown in FIG. 3C, the longitudinal oscillation caused by high frequency voltages A and B, respectively, cancels each other out, and material points Y2 and Z2 return to their original positions. As a result, as shown in FIG. 3D, when both the bending oscillations and the longitudinal oscillations combine, the material points Y and Z move by circulating further in the clockwise direction from their positions at time t2.

At time t4, as shown in FIG. 3A, high frequency voltage A becomes zero, and high frequency voltage B is a negative voltage. As shown in FIG. 3B, a bending oscillation is generated by high frequency voltage B, resulting in amplitudes of material points Y1 and Z1 which are less than at time t3. Moreover, as shown in FIG. 3C, the longitudinal oscillation generated by high frequency voltages A and B causes material points Y2 and Z2 to contract from the original position. As a result, as shown in FIG. 3D, both the bending oscillations and the longitudinal oscillations combine, and material points Y and Z move by circulating further clockwise from the positions at time t3.

At time t5, as shown in FIG. 3A, high frequency voltage A is a negative voltage, and high frequency voltage B is an equal negative voltage. As shown in FIG. 3B, the bending oscillations based on high frequency voltages A and B cancel each other out, and the amplitudes of material points Y1 and Z1 become zero. Moreover, as indicated by the arrows in FIG. 3C, the longitudinal oscillations generated by high frequency voltages A and B are generated in the contracting direction, toward the center X, and at t5 material points Y2 and Z2 show the maximum contraction. As a result, as shown in FIG. 3D, both the bending oscillations and longitudinal oscillations combine, and material points Y and Z move by circulating in a clockwise direction from the positions at time t4.

At times t6–t9, the bending oscillations and longitudinal oscillations are generated in a manner similar to that described above. As a result, as shown in FIG. 3D, material point Y and material point Z undergo elliptical movement in a clockwise direction.

In accordance with embodiments of the present invention, the ultrasonic vibration motor produces elliptical movement on the ends of protuberances 11b and 11c, thus producing drive power. Consequently, when pressure is applied by pressure application member 25, the end of protuberances 11b and 11c contact rotational members 21-1 and 21-2, the rotational members 21-1, 21-2 rotate, and relative movement member 31, positioned between rotational members 21-1, 22-1 and 21-2, 22-2, moves.

FIGS. 4–7 show further embodiments of an ultrasonic vibration motor in accordance with the present invention. The components of the ultrasonic vibration motor which are the same as those described with respect to the first embodiment are referred to by the same reference numerals and a detailed explanation of these parts will not be repeated below.

Figure 4A:
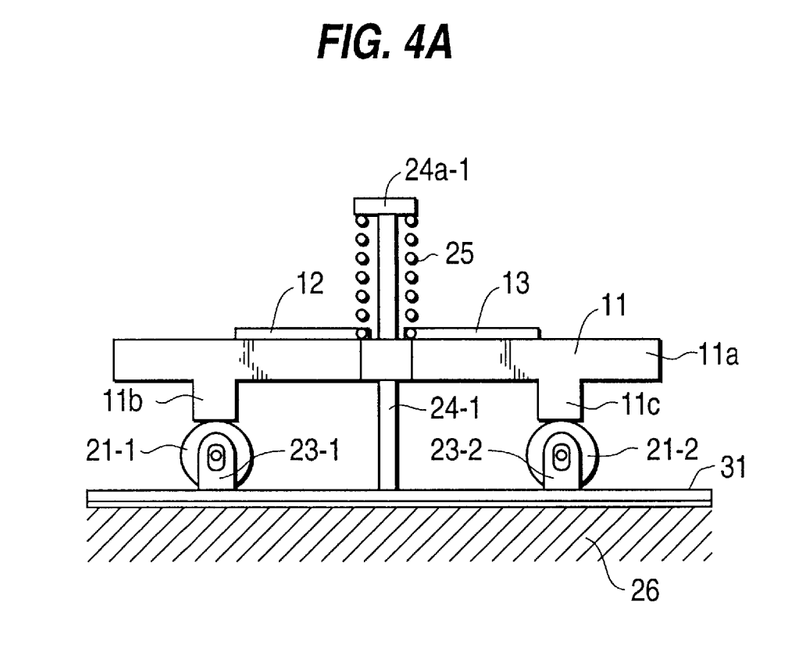
FIG. 4A and 4B are a front view and a side view, respectively, of an ultrasonic vibration motor in accordance with a second embodiment of the present invention.
Figure 4B:
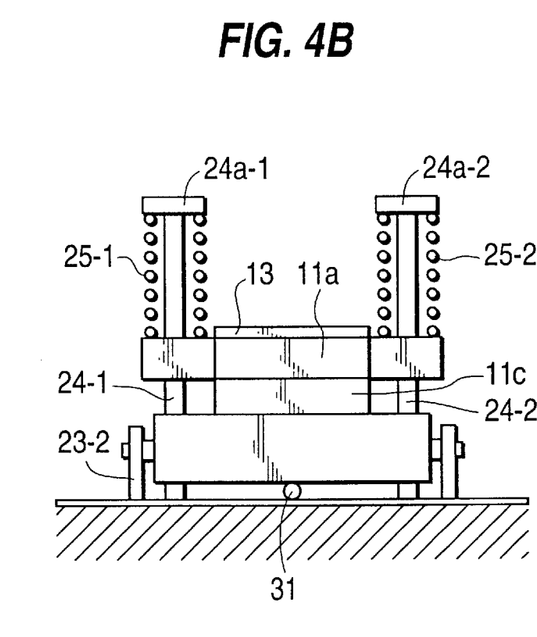

FIGS. 4A and 4B show a front view and a side view, respectively, of an ultrasonic vibration motor in accordance with a second embodiment of the present invention. In accordance with the second embodiment of the present invention, rotational members 22-1 and 22-2, which are included in the ultrasonic vibration motor shown in FIG. 1 in accordance with the first embodiment, are omitted. The second embodiment of the invention is effective when the frictional force between the relative movement member 31 and the securing member 26 is small, and has the advantages that the ultrasonic vibration motor can be made compact and low cost.

Figure 5:
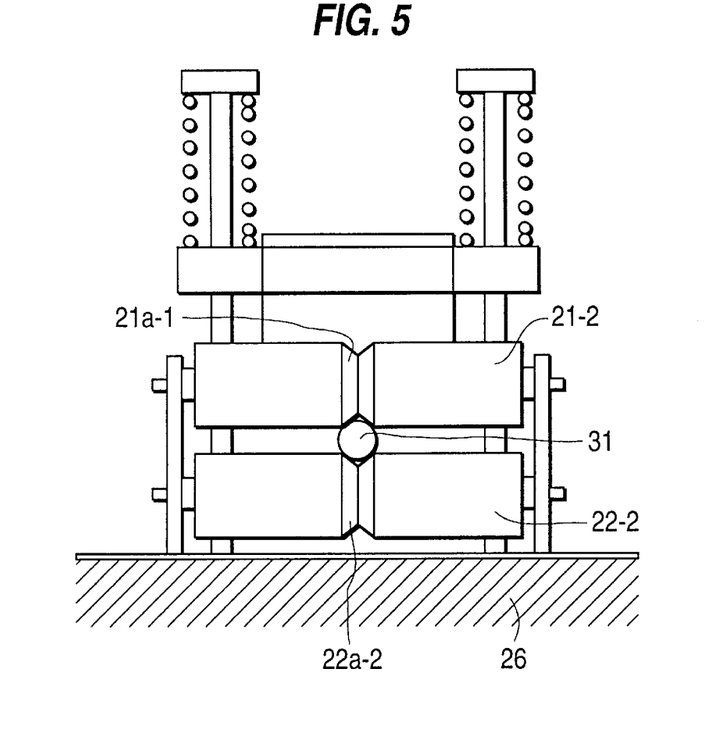
FIG. 5 is a view showing an ultrasonic vibration motor in accordance with a third embodiment of the present invention.

FIG. 5 shows an ultrasonic vibration motor in accordance with a third embodiment of the present invention. In accordance with the third embodiment of the invention, guides 21a-1, 21a-2, 22a-1 and 22a-2 (21a-2 and 22a-1 are not shown in the figure) are provided in rotational members 21-1, 21-2, 22-1, and 22-2, respectively, which are included in the ultrasonic vibration motor shown in FIG. 1 in accordance with the first embodiment. The ultrasonic vibration motor in accordance with the third embodiment has the advantage that the position of relative movement member 31 can be regulated. The shape of the guides 21a-1, 21a-2, 22a-1 and 22a-2 may correspond to the outer shape of relative movement member 31; however, the guides are not particularly limited to this shape.

Figure 6:
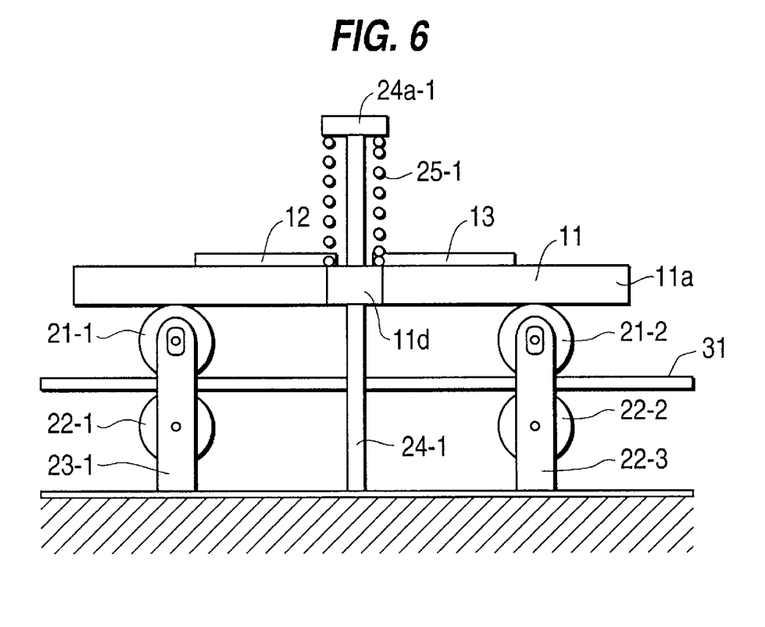
FIG. 6 is a view showing an ultrasonic vibration motor in accordance with a fourth embodiment of the present invention.

FIG. 6 shows an ultrasonic vibration motor in accordance with a fourth embodiment of the present invention. In accordance with the fourth embodiment, protuberances 11b and 11c are not provided on the elastic body 11. Further, in accordance with the fourth embodiment of the invention, rotational members 21-1 and 21-2 directly contact the base 11a. In this manner, even if there are no protuberances 11b and 11c, drive force can be transferred to rotational members 21-1 and 21-2.

Figure 7:
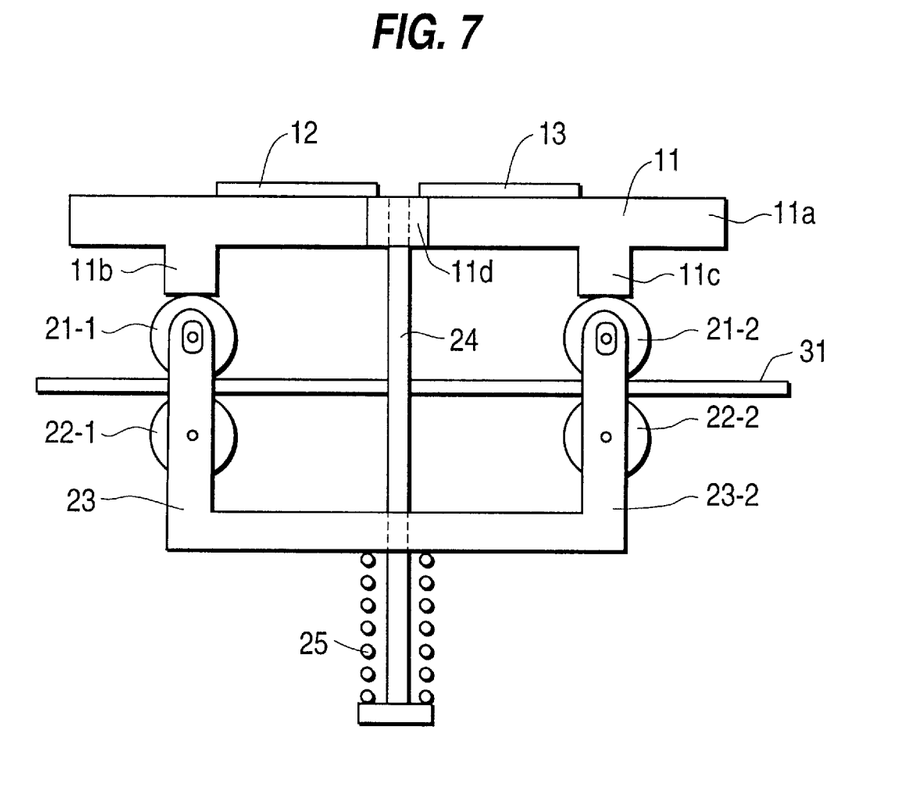
FIG. 7 is a view showing an ultrasonic vibration motor in accordance with a fifth embodiment of the present invention.

FIG. 7 shows an ultrasonic vibration motor in accordance with a fifth embodiment of the present invention. The ultrasonic vibration motor in accordance with the fifth embodiment provides the pressure application member 25, included in the ultrasonic vibration motor in accordance with the first embodiment, on the side of the support member 23. Further, if the relative movement member 31 is secured, the ultrasonic vibration motor shown in FIG. 7 can be a self-advancing type ultrasonic vibration motor.

Specifically, if the ultrasonic vibration motor shown in FIG. 7 is secured (as in the first through fourth embodiments), the relative movement member 31 is driven by the ultrasonic vibration motor; however, if the relative movement member 31 is secured, the ultrasonic vibration motor becomes a self-advancing type of ultrasonic vibration motor. Furthermore, in accordance with the structure of the fifth embodiment, even if the elastic body 11 is secured, relative movement member 31 can be the drive receiving object.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A vibration actuator, comprising:
    an elastic body;
    an electro-mechanical conversion element joined to the elastic body to harmonically produce a longitudinal oscillation and a bending oscillation on the elastic body, and to produce elliptical movement of a specified part of the elastic body;
    a first rotational member contacting the specified part of the elastic body and rotationally driven by the elliptical movement of the specified part of the elastic body;
    a relative movement member which is moved by the first rotational member;
    a second rotational member juxtaposed with the first rotational member, with the relative movement member in between the first rotational member and the second rotational member;
    a first support member to support at least one of the first and second rotational members;
    a second support member to support the elastic body; and
    a pressure application member connected to the second support member and to the elastic body to apply pressure in a direction to cause the elastic body and the first rotational member to come in contact.

2. A vibration actuator as recited in claim 1, wherein at least one of the first and second rotational members comprises a guide to control a position of the relative movement.

3. A vibration actuator as recited in claim 2, wherein the guide for at least one of the first and second rotational members is grooved and has a shape corresponding to an exterior shape of the relative movement member.

4. A vibration actuator as recited in claim 2, wherein at least one of the first and second rotational members includes a displacement absorption device which absorbs compression deflections of the relative movement member.

5. A vibration actuator as recited in claim 4, wherein the displacement absorption device comprises:
    a guide formed on the first support member which mobilely guides at least one of the first and second rotational members in a direction of displacement of the first and second rotational members; and
    an energization member to energize at least one of the first and second rotational members in a direction opposite to the displacement.

6. A vibration actuator as recited in claim 1, wherein the elastic body comprises a first protuberance and a second protuberance which undergo elliptical movement and contact the first rotational member to drive the first rotational member when pressure is applied by the pressure application member.

7. A vibration actuator as recited in claim 1, wherein the surface of the first rotational member comprises a resin.

8. A vibration actuator as recited in claim 1, further comprising:
    a third rotational member contacting the specified part of the elastic body and rotationally driven by the elliptical movement of the specified part of the elastic body; and
    a fourth rotational member juxtaposed with the third rotational member, with the relative movement member in between the third rotational member and the fourth rotational member.

9. A vibration actuator as recited in claim 8, wherein the specified part of the elastic body comprises a first protuberance and a second protuberance which undergo elliptical movement and which contact the first rotational member and the third rotational member, respectively, to drive the first and third rotational member when pressure is applied by the pressure application member.

10. An ultrasonic vibration motor, comprising:
    an elastic body;
    an electro-mechanical conversion element joined to the elastic body to harmonically produce a longitudinal oscillation and a bending oscillation on the elastic body, and to produce elliptical movement of a specified part of the elastic body;

a first rotational member contacting the specified part of the elastic body and rotationally driven by the elliptical movement of the specified part of the elastic body;

a relative movement member contacting the first rotational member and moved by the rotation of the first rotational member; and a second rotational member contacting the relative movement member at a point opposite to a point the first rotational member contacts the relative movement member, with the relative movement member in-between the first rotational member and the second rotational member.

11. A vibration actuator as recited in claim 10, wherein at least one of the first and second rotational members comprises a guide to control a position of the relative movement member.

12. A vibration actuator as recited in claim 10, wherein the elastic body comprises a protuberance, the protuberance is the part of the elastic body which undergoes elliptical movement, and the rotational member contacts the protuberance.

13. A vibration actuator, comprising:

an elastic body;

an electro-mechanical conversion element joined to the elastic body to harmonically produce a longitudinal oscillation and a bending oscillation on the elastic body, and to produce elliptical movement of a specified part of the elastic body;

a first rotational member contacting the specified part of the elastic body and rotationally driven by the elliptical movement of the specified part of the elastic body;

a relative movement member which is moved by the first rotational member;

a member juxtaposed with the first rotational member, with the relative movement member in between the first rotational member and the member juxtaposed with the first rotational member;

a first support member to support at least one of the first rotational member and the member juxtaposed with the first rotational member;

a second support member to support the elastic body; and a pressure application member connected to the second support member and to the elastic body to apply pressure in a direction to cause the elastic body and the first rotational member to come in contact.

14. A vibration actuator as recited in claim 13, wherein at least one of the first rotational member and the member juxtaposed with the first rotational member comprises a guide to control a position of the relative movement member.

15. A vibration actuator as recited in claim 13, wherein the elastic body comprises a protuberance, the protuberance is the part of the elastic body which undergoes elliptical movement, and the rotational member contacts the protuberance.

* * * * *